Figure 1:
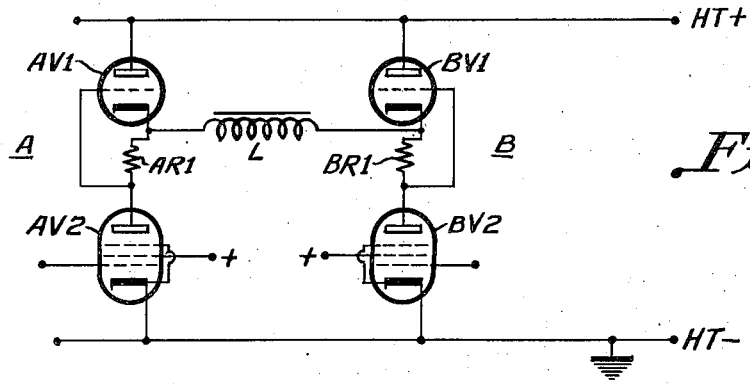

May 3, 1949.  D. L. PLAISTOWE ET AL  2,469,051
CATHODE-RAY TUBE DEFLECTING SYSTEM
Filed May 11, 1948

Inventor
Donald Leopold Plaistowe,
Roger Prowse Shipway
By J. L. Whittaker
Attorney Patented May 3, 1949

2,469,051

UNITED STATES PATENT OFFICE 2,469,051

CATHODE-RAY TUBE DEFLECTING SYSTEM

Donald Leopold Plaistowe and Roger Prowse Shipway, Chelmsford, England, assignors to Radio Corporation of America, a corporation of Delaware Application May 11, 1948, Serial No. 26,268
In Great Britain January 30, 1947

Section 1, Public Law 690, August 8, 1946

6 Claims. (Cl. 315—27)

This invention relates to cathode ray tube (C. R. T.) deflecting systems and more particularly to deflecting systems of the electro-magnetic type, that is to say, to deflecting systems of the type in which deflection of the cathode ray in at least one direction is obtained by means of a deflecting coil or coils. Deflecting systems of the type referred to are frequently employed where high speed scanning or deflection is required, for example, for radar displays.

Deflection of the cathode ray in a C. R. T. along a predetermined axis on either side of the undeflected position thereof may be effected either by means of a single coil type of deflecting system or a twin coil type of system. In the former case it is necessary to pass current through the coil in one or other direction in dependence upon the sense of deflection required. Where a twin coil type of system is used deflection current is passed through one or other section of the twin system in dependence upon the sense of deflection required.

The twin coil type of system has the defect of requiring a more or less complex coil structure and from this point of view, therefore, there is considerable practical advantage in the simpler single coil type of system. Known deflecting circuit arrangements for signal coil type systems have, however, important operating disadvantages which it is the object of the present invention to avoid.

In most known deflecting circuit arrangements for single coil type systems the coil is fed, by transformer or shunt feed choke-capacity coupling, with current derived from a vacuum tube, commonly called the "current tube," the current through which is controlled by the deflecting voltage wave. With either form of coupling between the current tube and the coil the undeflected or rest position of the ray corresponds to the mean value of the deflecting current wave through the coil and if thus undeflected position is unsatisfactory the said mean value has to be altered by superimposing a steady direct current on the deflecting wave form proper. This superimposed direct current, which thus constitutes a "shift" current, has in many cases to be adjusted from time to time during operation to bring the undeflected ray to a desired rest position. Thus, for example, in a radar system employing a so-called "A type" display (i. e. one in which the distance of a target is indicated as distance along a horizontal trace between the transmitted pulse and the received echo pulse) if the start of the trace is required to correspond always to the position of the transmitter the "shift" current has to be adjusted each time a different range of display is required. Again in the case of a radar or other system involving combined radial and circular deflection, for example, in a so-called P. P. I. system in which two mutually perpendicular coil systems fed in quadrature are employed, it becomes necessary, in order that the radial deflections shall always start from the centre of the C. R. T. screen, to superimpose on the deflecting wave form a relatively slowly varying "shift" current proportional to the sine (or cosine) of the angle of deflection. Further the amplitude of the superimposed sinusoidal "shift" current has to be adjusted to correspond to the range of the display required.

In these and other cases the necessity for providing shift currents and adjustments thereof constitutes a serious operating disadvantage.

The present invention seeks to provide a deflecting circuit arrangement for a single coil type of system such that the above mentioned defects are avoided and the need for adjustable or varying "shift" current is eliminated.

In the present specification the expression "single coil type" as applied to a deflecting system is used to mean a system in which a single winding or series of windings is employed for producing deflection in both senses of a given direction as distinct from a double coil or twin type of system wherein one or other of two windings or series of windings is used for producing deflections of a given direction in one or other sense. Accordingly the expression "single coil type system" as herein employed is properly applicable to an arrangement in which deflection in more than one direction is obtained by means of more than one coil system; thus a P. P. I. system employing two single coil systems at right angles to one another, one for deflection in one direction and the other for deflection in the perpendicular direction, is a single coil type system within the meaning of this specification.

According to this invention a deflecting circuit arrangement for a C. R. T. having a single coil type of electro-magnetic deflecting system includes two circuit arms in parallel with one another across a source of operating potential, each arm consisting of two controllable electron vacuum tube spaces in series, one space being arranged to have its conductivity controlled in dependence upon the current flow through the other so that when said other space is at or near cut-off said one space is fully conductive and vice versa; an electro-magnetic deflecting coil connected between corresponding intermediate points on said circuit arms, each point being between the two controllable vacuum tube spaces in the appropriate arm; and means for applying deflection controlling potentials to control the states of conductivity of the two said other vacuum tube spaces so that for deflection in one sense, the first of said other spaces is conductive and the second is at or near cut-off while for deflection in the other sense the conductivity states are reversed.

It will be seen, therefore, that with an arrangement in accordance with this invention deflection in one sense is obtained by virtue of current flowing through part of one circuit arm, then through the coil in one direction, and then through the remaining part of the other circuit arm while for deflection in the other sense the current flow through the coil is reversed taking place through those parts of the circuit arms which were previously at or near cut-off.

Where it is required to construct an arrangement in accordance with this invention employing more than one coil system for deflection in more than one direction, for example, where it is required to construct a deflecting circuit arrangement for a P. P. I. display, two circuit arrangements in accordance with this invention are employed one for each coil system said arrangements being controlled by suitable deflecting voltages in suitable phase relation—in the case of a P. P. I. system by voltages whose amplitudes vary in quadrature.

Figure 2:
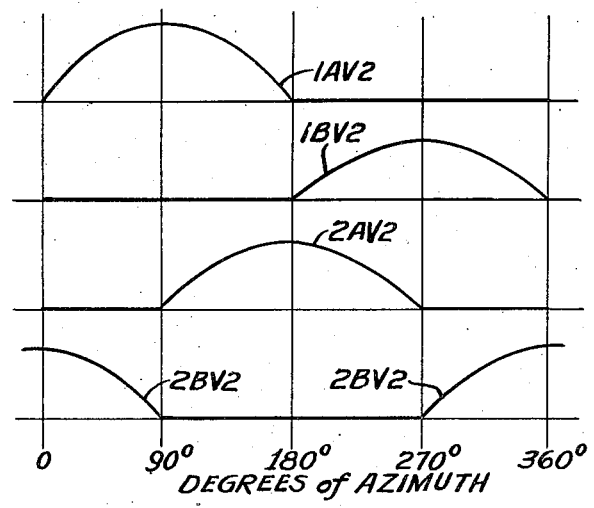
Figure 3:
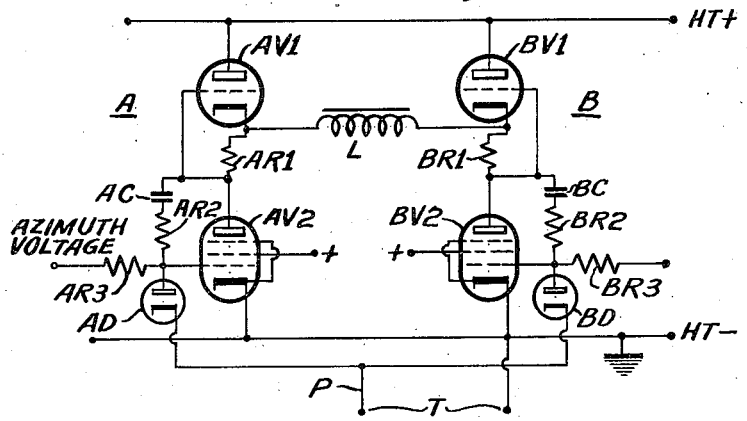

The invention is illustrated in the accompanying drawings in which Figs. 1 and 3 are diagrams of two embodiments of the invention and Fig. 2 is an explanatory graphical figure.

Referring to Figure 1 two similar circuit arms generally designated A and B and each consisting of two tubes AV1, AV2, or BV1, BV2 in series are connected in parallel across a source (not shown) of operating potential connected at HT+ and HT—. The tubes may be of any convenient known kind but for the sake of simplicity the tubes AV1, BV1, on the positive side in the circuit arms are shown as triodes and the other tubes are shown as pentodes. The cathode of each triode is connected to the anode of the pentode in its own arm through a series resistance AR1 or BR1 and the grid of each triode is connected to the anode side of the pentode in its own arm. The triodes should be tubes with short grid bases. The deflecting coil L is connected between the cathodes of the two triodes and deflecting voltage from a source not shown are applied to control the conductivities of the pentodes so that one is conductive for deflection in one sense and the other is conductive for deflection in the other. For example, deflecting voltage waves 180° out of phase with one another may be applied to the control grids of the pentodes.

The arrangement is such that the state of conductivity of each triode is reversed when the state of conductivity of the pentode in the same circuit arm is reversed, the triode being at or near cut-off when the pentode is conductive and vice-versa. This is because current in the pentode flows through the resistance in the cathode circuit of the triode in the same arm, so biassing the latter off. Accordingly when one pentode is conductive the current flow through the coil will be through that pentode, through the coil, and through the triode in the other arm, which is conductive because there is no current through its cathode resistor while when the other pentode is conductive the current flow through the coil will be in the reverse direction through the circuit including the other pentode and the other triode.

For a P. P. I. or similar display two arrangements as above described may be employed. The amplitudes of the deflecting wave-forms applied to the grids of the pentodes should vary in a similar way, the variation in each case consisting of a sinusoidal half wave followed by a steady value, which may be zero. This is indicated in conventional graphical form in Figure 2 in which 1AV2 and 1BV2 represent the variations in amplitude of the deflecting voltage waves to be applied respectively to the tubes AV2 and BV2 of one arrangement, while 2AV2 and 2BV2 represent the waves to be applied to the tubes AB2 and BV2 of the other arrangement to produce a radial scan such as would be required in a P. P. I. system. In Figure 2 the abscissae are degrees of azimuth and as will be seen the sinusoidal half waves on the pentodes AV2 and BV2 of each arrangement occur during adjacent 180° sectors of azimuth the said sector for pentode AV2 of the second arrangement being at 90° with respect to those for the corresponding pentode of the first arrangement and that for pentode BV2 of second arrangement being similarly at 90° with respect to that for the corresponding pentode of the first arrangement.

The pentodes (or other tubes employed as current tubes) in an arrangement in accordance with this invention may with advantage be arranged themselves to operate as time base generators controlled by triggering voltages. There are various ways in which this may be done, one being to employ the so-called "magnetic-Miller" circuit known per se. Thus the circuit of Figure 1 may be modified to operate in "magnetic-Miller" fashion as shown in Figure 3 by providing a capacity AC or BC in series with a resistance AR2 or BR2 in a feed-back path between the anode and control grid of each pentode; by inserting a resistance AR3 or BR3 in each lead through which (in the case of a P. P. I. system) azimuth voltages are applied to the control grids of the pentodes; and by connecting each pentode control grid through a diode or other rectifier AD or BD to a common lead P between which and the common pentode cathode connection a triggering voltage from a source not shown is applied as indicated at T.

With this arrangement the pentodes are initially held just beyond cut-off by the diodes. When the triggering wave form is applied, the diode cathodes are raised above earth potential thus freeing the pentode control grids which are then able to change in voltage under the influence of the applied azimuth voltages and under the influence of the feed-back voltages from the respective anodes. The slowly varying azimuth voltages should be of wave shapes similar to the amplitude variations shown in Figure 2. A substantially linear rise of current, proportional in amplitude to the value of the applied azimuth voltage can be obtained by suitable choosing the capacity AC or BC in the appropriate feed-back path in relation to the sum of the (conducting) impedance of the triode in the other arm, the DC resistance of the deflecting coil, and the resistance between said coil and the anode of the pentode in question, and by suitable choice of the resistance AR2 or BR2 in the said feedback path in relation to the inductance of the coil. By suitably choosing the series capacity and resistance values in the feedback paths the scan speed may be made dependent upon the values of the resistances inserted in the pentode control grid leads. As in the case of Figure 1 the arrangement of Figure 3 may be duplicated for example for a P. P. I. system.

In arrangements in accordance with this invention a negative feed-back, developed across additional resistances inserted in their responsive cathode circuits may with advantage be applied to the triodes (or other tubes replacing them) such application tending to straighten the operating characteristics of the triodes and to cause them to produce higher degrees of constancy of impedance when in the conducting condition.

In arrangements in which the current tubes (in the foregoing embodiments the pentodes) are caused to operate also as "magnetic Miller" time base tubes, the resistances inserted in the grid leads are preferably made adjustable to allow of adjustment of scanning speed and, if desired, other circuit elements may also be made adjustable to facilitate setting up the apparatus.

We claim as our invention:

1. A circuit arrangement for a single coil type of electro-magnetic deflection system for a cathode ray tube said arrangement including two circuit arms in parallel with one another across a source of operating potential, each arm consisting of two controllable electron vacuum tube spaces in series, one space being arranged to have its conductivity controlled in dependence upon the current flow through the other so that when said other space is at or near cut-off said one space is fully conductive and vice versa; an electro-magnetic deflecting coil connected between corresponding intermediate points on said circuit arms, each point being between the two controllable vacuum tube spaces in the appropriate arm; and means for applying deflection controlling potentials to control the states of conductivity of the two said other vacuum tube spaces so that for deflection in one sense, the first of said other spaces is conductive and the second is at or near cut-off while for deflection in the other sense the conductivity states are reversed.

2. An arrangement as claimed in claim 1 wherein each arm comprises a first tube, a resistance and a second tube in series in the order stated across a source of potential, the anode of the first tube and the cathode of the second being connected to opposite terminals of said source, a connection between the control grid of each first tube and the anode of the second tube in the same arm, an electro-magnetic deflecting coil connected between the cathodes of said first tubes and means for applying deflection controlling voltages to control the conductivities of said second tubes so that one is conductive for deflection in one sense and the other is conductive for deflection in the other.

3. An arrangement as claimed in claim 2 wherein deflecting voltage waves 180° out of phase with one another are applied to the control grids of the second tubes.

4. An arrangement as claimed in claim 3 wherein the tubes whose spaces are subjected to conductivity control by deflection controlling voltages are arranged themselves to operate as time base generators controlled by triggering voltages.

5. An arrangement as claimed in claim 4 wherein each second tube is caused to operate in so-called "magnetic-Miller" fashion by providing a capacity in series with a resistance in a feed back path between the anode and control grid of each tube, inserting a resistance in each lead through which the deflection controlling voltages are applied and by connecting each second tube control grid through a rectifier to a common point to which a triggering voltage is applied.

6. An arrangement as claimed in claim 5 wherein negative feed back is applied to the tubes whose spaces are not subjected to conductivity control by deflection controlling voltages.

DONALD LEOPOLD PLAISTOWE.
ROGER PROWSE SHIPWAY.

No references cited.